(12) United States Patent
Hebard

(10) Patent No.: US 8,341,545 B2
(45) Date of Patent: Dec. 25, 2012

(54) SYSTEM AND METHOD FOR FOCUSING A VIEW OF DATA ON A SELECTED SUBSET

(75) Inventor: Emily W. Hebard, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 917 days.

(21) Appl. No.: 12/043,463

(22) Filed: Mar. 6, 2008

(65) Prior Publication Data
US 2009/0228818 A1 Sep. 10, 2009

(51) Int. Cl.
G06F 3/048 (2006.01)
(52) U.S. Cl. .......... 715/786; 715/767; 715/860
(58) Field of Classification Search .......... 715/768, 715/860
See application file for complete search history.

(56) References Cited

U.S. PATENT DOCUMENTS

| 6,230,171 | B1 * | 5/2001 | Pacifici et al. | 715/201 |
| 6,473,103 | B1 * | 10/2002 | Bailey et al. | 715/794 |
| 6,920,613 | B2 * | 7/2005 | Dorsey et al. | 715/714 |
| 7,082,577 | B1 * | 7/2006 | Brosnahan | 715/860 |
| 7,346,846 | B2 * | 3/2008 | Rossi et al. | 715/705 |
| 7,614,011 | B2 * | 11/2009 | Karidis et al. | 715/789 |
| 7,765,488 | B2 * | 7/2010 | Pagan | 715/790 |
| 7,779,353 | B2 * | 8/2010 | Grigoriu et al. | 715/255 |
| 2002/0069219 | A1 * | 6/2002 | Weng | 707/501.1 |
| 2006/0200775 | A1 * | 9/2006 | Behr et al. | 715/767 |

FOREIGN PATENT DOCUMENTS
JP 2000155635 A * 6/2000

* cited by examiner

Primary Examiner — Alvin Tan
(74) Attorney, Agent, or Firm — Park, Vaughan, Fleming & Dowler LLP

(57) ABSTRACT

A system, method and graphical user interface for focusing a view of displayed data upon a subset of the data. In a view of multiple values, fields, objects or other data, a subset of the data is selected because it has changed, because it is associated with a recommended action, because it warrants a user's attention, or for some other reason. The remaining data is then masked or covered with a semi-transparent layer that suppresses the data and obscures any highlighting, emphasis or other complexity among the covered data. The user's attention is thus focused upon the selected subset of data without increasing the cognitive load forced on the user.

12 Claims, 3 Drawing Sheets

Spreadsheet 210

Workflow 230

Document 250

Spreadsheet 210

Workflow 230

Document 250

SYSTEM AND METHOD FOR FOCUSING A VIEW OF DATA ON A SELECTED SUBSET

BACKGROUND

This invention relates to the field of computer systems. More particularly, a system and methods are provided for focusing a view of a set of data on a selected subset.

In situations in which a relatively large set of data or multiple data objects are displayed, a user can easily be overwhelmed by the amount of data. As a result, it may be difficult to identify which data requires attention or which data object should be manipulated.

For example, in a spreadsheet, database view or other data presentation, a value that has been recently established or updated may be lost amid the plethora of other data, thereby preventing a user from rapidly grasping the change. Or, in a display of data objects representing a workflow, objects representing different tasks may be similar in appearance, thereby preventing the user from easily determining which task to focus upon. In short, current methods of presenting data often involve so much data or are so complex that it becomes difficult for a human observer to easily parse a presentation.

Some application programs attempt to highlight data values or objects by presenting them in different colors or fonts. However, this adds to the complexity and the cognitive load placed on the user and can complicate the problem. As the number of data items and the number of distinguishing characteristics among the items increases, the clarity of the data presentation decreases and a user's focus on what is important can be lost.

SUMMARY

In embodiments of the invention, a system, method and graphical user interface are provided for focusing a view of displayed data upon a subset of the data. In a view of multiple values, fields, objects or other data, a subset of the data is selected because it has changed, because it is associated with a recommended action, because it warrants a user's attention, or for some other reason. The remaining data is then masked or covered with a semi-transparent layer that suppresses the data and obscures any highlighting, emphasis or other complexity among the covered data. The user's attention is thus focused upon the selected subset of data without increasing the cognitive load forced on the user.

In some embodiments of the invention, the semi-transparent layer may be applied to screen data that has not changed, thereby promoting focus on the data that has changed. For example, when a user updates a data element or a program performs an auto-update to a data element, other elements may be masked to de-emphasize them.

DETAILED DESCRIPTION

Figure 1:
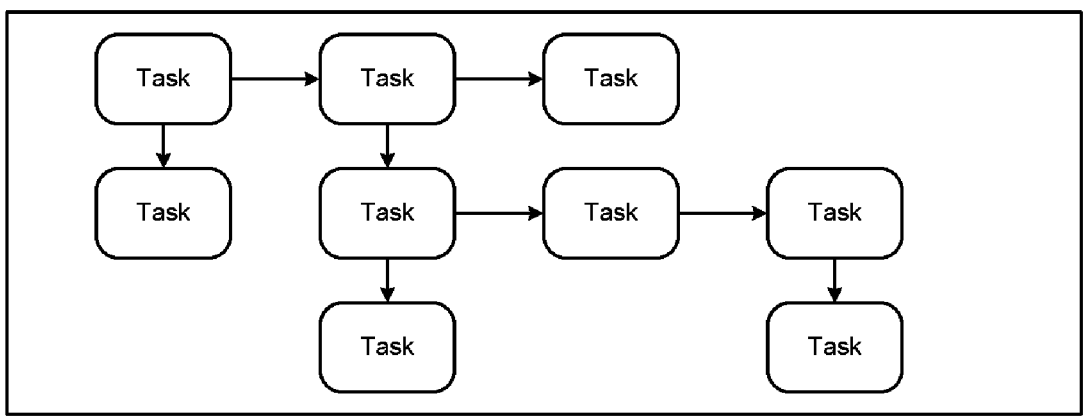
FIG. 1 illustrates data views upon which embodiments of the present invention may be implemented.

The following description is presented to enable any person skilled in the art to make and use the invention, and is provided in the context of particular applications of the invention and their requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for focusing a user's view upon selected data. The presented data may involve discrete data values or items (e.g., values within a spreadsheet, table or other document) or objects that represent other data, processes or tasks (e.g., within a workflow application). The system includes a computer system for displaying the data and/or a graphical user interface designed to help focus the user's attention on the selected set or subset of data.

In one implementation of this embodiment, the data presentation is masked with a semi-transparent screen or layer, except for the selected data. Instead of increasing the complexity of the presentation by adding distinguishing characteristics to the selected data, in this implementation the complexity of the presentation is decreased by uniformly masking the unselected data, thereby obscuring any distinguishing characteristics among that data. As a result, focus on the selected data can be significantly increased without altering it.

Embodiments of the invention may be implemented within financial management programs (e.g., for tracking financial data, calculating taxes, budgeting), office automation software (e.g., database, spreadsheet, word processing, calendar), productivity software (e.g., for tracking project status, workflows), and/or other types of programs, applets, utilities and so on. These embodiments may be embedded within the programs or configured to augment the software as originally installed (e.g., as add-ons or plug-ins).

In one embodiment of the invention, when multiple data elements are presented in one view and a user alters a subset of the displayed elements, the semi-transparent layer may be applied to cover all data elements except those that were changed.

In another embodiment of the invention, in which one or more data elements within a user interface are automatically updated (based on stimuli internal or external to the program that employs the user interface), the semi-transparent layer is employed to mask all but the most recently updated elements.

In yet another embodiment, in a page or form that requires a user to make a choice among multiple options (e.g., for inputting data, selecting an action), if the system possesses sufficient information to suggest one of the options, the others may be covered by the mask.

In these and other embodiments, objects that may be screened by the semi-transparent layer could include data that has not been recently modified, dialog boxes, navigational controls, static text, etc.

FIG. 1 depicts various data presentations or program views that could benefit from embodiments of the invention, to help a user or viewer focus on selected information.

In FIG. 1, spreadsheet 110 presents numerous data values, any of which may be updated, replaced, recalculated or otherwise manipulated. The number of values and the "busyness" of the view make it difficult to focus a user's attention on an important value. Thus, if a particular value has recently changed, or is outside (or inside) some predefined range, it may be difficult to pick that value out of the presentation.

Workflow 130 presents several objects representing project tasks, access points into a workflow, or other stages of a multi-stage process. Again, the number of objects and possible paths through the workflow make it difficult to focus a user's attention on a particular object—perhaps an object representing the next suggested step, a task that has been modified in some way, etc.

Document 150 is a document (e.g., a word processing document) shared among multiple users. Although some application programs may attempt to highlight different portions of document text in different ways (e.g., underlining, bolding, different color), doing so inherently increases the complexity of the view. Applying different types of highlighting within a single view of the document could detract from rather than increase a user's focus on one particular passage.

Figure 2:
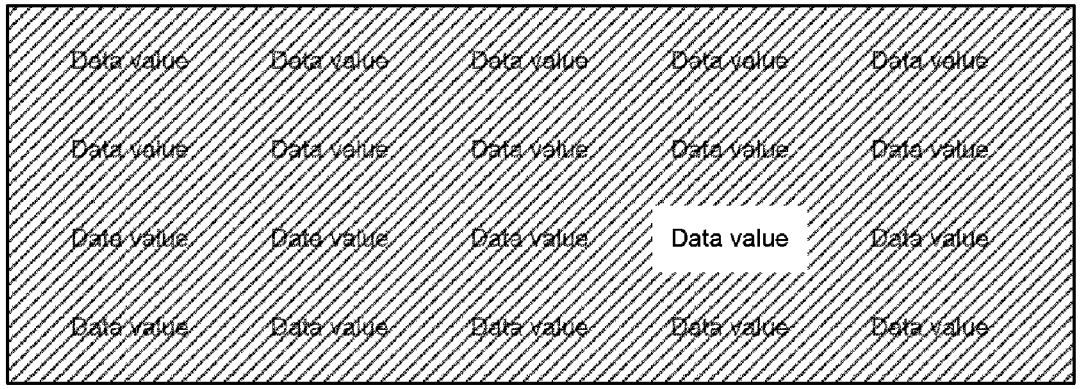
FIG. 2 illustrates the data views of FIG. 1 as they may be presented to focus attention on selected subsets of data, according to embodiments of the invention.
Figure 2:
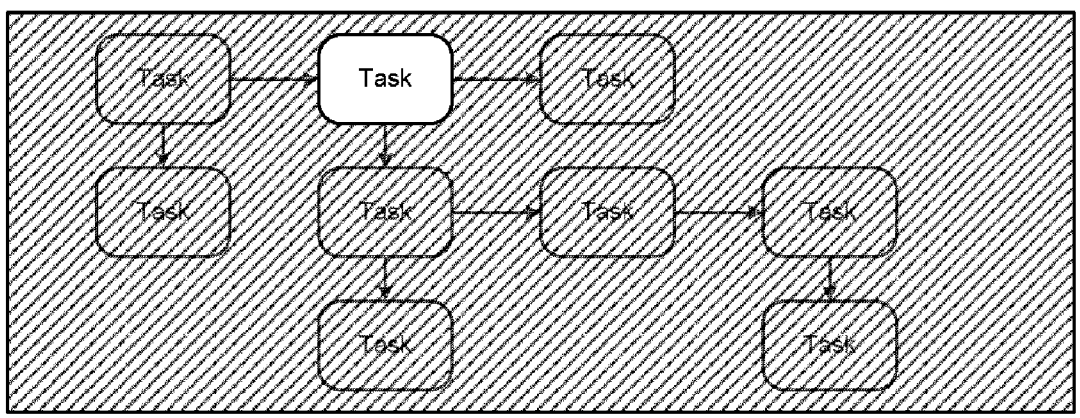

FIG. 2 depicts the data presentations of FIG. 1 as they may be transformed in accordance with embodiments of the invention described herein. Each data presentation or view is masked with a semi-transparent mask, screen or layer that obscures, to some degree, data or information other than a selected subset of the contents of the presentation.

Due to the wide variety among the types of data or other information that may be presented within a presentation, the data or information selected to receive a user's focus within a masked presentation (i.e., by not being masked) may be referred to herein as a selected set or subset of data, a data object, a value, an element or some other entity.

In FIG. 2, spreadsheet 210 is configured to display the same data values displayed in spreadsheet 110, but is designed to quickly focus a user's attention on one or more selected data values. For example, the selected data value may have recently changed, may fall outside some preselected range of values, or may warrant the user's attention for some other reason.

Workflow 230 displays the same data objects, with all but a selected object (or objects) masked. The selected object may be the next recommended task within a workflow, for example.

Unaltered portions of document 250 have been masked to focus the user's attention on a passage that was amended (e.g., by a collaborating user). Note that the granularity of a mask may vary in different embodiments. For example, instead of selecting the entire amended sentence (and masking the remainder of the view), only the individual words that changed might be selected.

In different embodiments of the invention, a mask, cover or screen applied to a presentation or view may be translucent or even opaque, and may be of any design. For example, a mask may comprise lines, points, clouds, or other elements arranged in any pattern, or may comprise a substantially uniform dispersion of pixels that together make the mask appear grey (or some other color).

A masked data presentation may be displayed automatically (e.g., when a value changes), or may be triggered manually by a user. For example, a viewer of workflow 130 may be unsure of which task within the represented workflow he or she should focus on. By activating a control for a masked version of the presentation, the user may spur the system to identify the most appropriate task for the user's attention and mask the others. The system's determination of which task to select for the user's focus may be based on what has changed, what tasks have been completed, what steps of the different tasks have been performed, etc.

Thus, a data object may be selected for focus within a masked presentation based on the detection of a change in the object (or what it represents), the determination that it requires attention (e.g., because it satisfies a trigger for raising an alarm or alert), completion of a task associated with the object, or for some other reason. Data changes that cause an element to receive focus within a masked presentation may be generated within the same computer system that displays the masked presentation, or may occur externally and involve notification to this computer system.

The display of a masked or screened data presentation may automatically revert to an unmasked or unscreened view after a certain time period, after a user takes some action (e.g., to acknowledge the masked presentation, to edit or otherwise interact with displayed information), or in response to some other trigger.

In the embodiments of the invention reflected in FIG. 2, a user can still see the masked information, and may or may not be able to interact with it. For example, while spreadsheet 210 is displayed, the user may be able to click on and change a data value other than the selected data value that is the focus of the masked presentation.

In an embodiment of the invention, the availability or use of masked data presentations may be turned on or off by a user. In another embodiment, masked presentations may be used as part of a tutorial for an application program or other software, or while a new user becomes familiar with the use of a program.

In yet another embodiment, a masked presentation may be triggered by error within a user's input. For example, when a user inputs information into a form or template, a masked view of the interface or form may be presented to focus the user's attention on omitted or incorrect input.

In different embodiments of the invention, the system may perform different levels or amounts of analysis to determine what to obscure and what not to obscure within a user interface or other presentation. For example, when a user changes a data element in a data view, the program may determine the ramifications of the change, the user's level of sophistication, the frequency with which the user has changed that element in the past, other users' action with the same data view, etc.

Illustratively, if the user initiates a change that will spawn other non-trivial action (e.g., a change to a manufacturing process, generation of an automated alert or warning, selection or modification of a next step in a workflow), then it may be desirable to call the user's attention to the change by masking other data elements. Or, if confirmation of modification to a particular data element is desired (e.g., the entry of an account number to send funds to), the semi-transparent layer may be applied as an alternative means of confirmation (e.g., instead of requiring the user to enter the data twice). By focusing the user's attention on the un-masked element, there is less chance that the element was entered incorrectly or inadvertently.

Conversely, if a modified data element is a clerical entry of rather low importance, there may be no need to bring it to the user's attention.

The user's level of sophistication or familiarity with a program or user interface may be considered by applying the semi-transparent mask more often until the user's familiarity or experience increases (e.g., to focus attention more frequently on altered data elements). Therefore, the user's attention may be focused more often, on more modified data elements (i.e., by applying the semi-transparent mask to unmodified elements), until the user has interacted with the current data view some threshold number of times or made some number of changes.

If a user has a history of a particular pattern of modification—which may indicate a high level of familiarity and comfort with an interface—then the masking layer may be applied less frequently when he or she makes the same type of modification. When he or she departs from previous patterns of activity, the semi-transparent layer may be triggered more often.

In other embodiments of the invention, a determination as to whether or not to apply the semi-transparent layer over unmodified data items may depend on who or what changed the items that were modified. For example, if a data modification was generated by a separate process, a user other than the current user, an external event, or some other actor besides the current user, it may be more important to bring the modification(s) to the current user's attention.

As alluded to above, in some embodiments of the invention user behavior may be tracked and used to determine whether and when to mask a data view. For example, the history of interaction of a group of related users (e.g., users having a common role or set of responsibilities) may be tracked. When a new user in that group initiates the same workflow or interacts with the same user interface for which the related users' behavior was tracked, that history may be used to decide what to mask and what not to mask (and whether to apply the mask at all). Thus, the mask may be used to focus the new user's attention on workflow steps that the other users chose (e.g., in order to help the user select an appropriate next step) or on data changes the new user makes that vary from the other users' patterns of activity.

Figure 3:
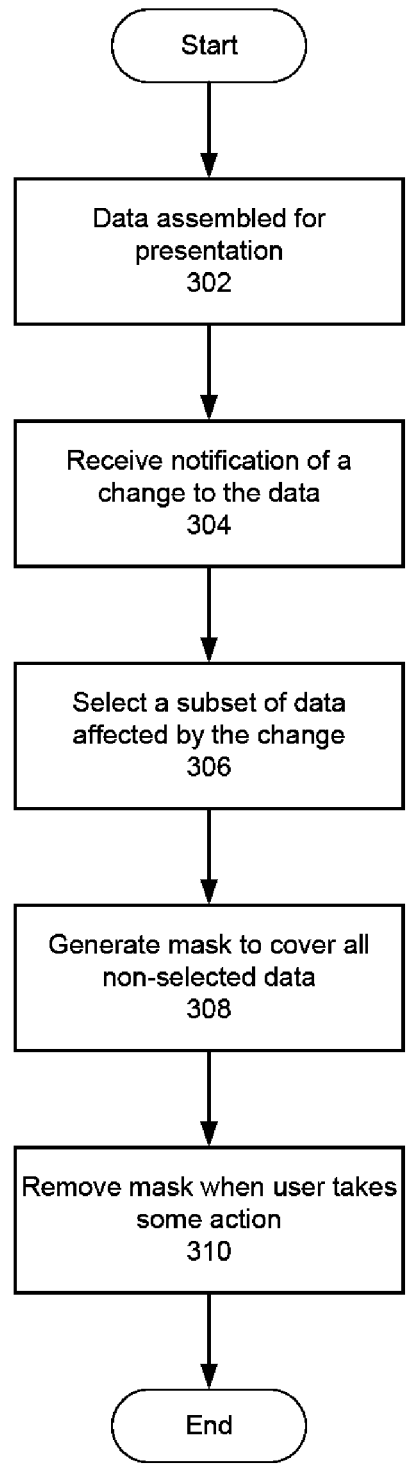
FIG. 3 is a flowchart demonstrating a method of focusing a data view upon a selected set of data, in accordance with an embodiment of the present invention.

FIG. 3 is a flowchart demonstrating one method of focusing a viewer's attention on a selected set of data within a data view, according to one embodiment of the invention.

In operation 302, data are assembled for presentation in an application program, utility, script or other computer-executable code configured to present the data. Thus, the data may be drawn from a database, a spreadsheet, a document, a workflow, etc.

In operation 304, notification is received of a change to some portion of the data, or to information associated with some portion of the data. For example, one of multiple collaborators sharing access to the data may promulgate a new or edited version, a new or updated value may be received from an automated process (e.g., a process configured to monitor a manufacturing process and produce status readings), etc.

Thus, the change need not directly affect the displayed data. For example, the notification may relate to completion of one step of one task within a workflow, wherein the presented data comprise objects representing multiple tasks or steps of the flow.

In operation 306, a subset of data encompassing or associated with the update is selected. Thus, the selected data may comprise the actual data that was altered (e.g., an updated field in a spreadsheet, a new paragraph for a document), or data objects that relate to or are associated with the update.

In operation 308, the data view is configured to place a semi-transparent mask or layer over all the data that was not selected. At the same time, highlighting or distinguishing characteristics of the obscured data (e.g., underlining, bolding, different colors) may be removed. This may help to further reduce the user's cognitive load and avoid distracting the user's attention from the selected data.

In operation 310, the mask or layer is removed only after the user takes some action (e.g., moves a cursor, clicks on a control within the data view). This ensures that the user had adequate opportunity to observe the focus placed on the selected data (e.g., he or she may have been away from the computer system when the mask was raised). In another embodiment, the mask or layer may be removed after some default time period.

The program environment in which an embodiment of the present invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application-specific integrated circuits, programmable logic devices, or various combinations thereof.

In particular, methods described herein may be implemented using data structures and program code residing on a suitable computer-readable medium, which may be any device or medium that can store data and/or code for use by a computer system. This includes, but is not limited to, volatile memory, non-volatile memory, magnetic and optical storage devices such as disk drives, magnetic tapes, CDs (compact discs), DVDs (digital versatile discs or digital video discs), or other media capable of storing computer-readable media now known or later developed.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of displaying data, the method comprising:
    displaying a plurality of data objects;
    detecting modifications to the plurality of data objects;
    determining a significance of each detected modification;
    selecting a subset of data objects within the plurality of data objects based on the determined significance of each detected modification;
    masking all but the selected subset of data objects with a semi-transparent mask, wherein masking involves removing highlighting and distinguishing characteristics among the masked data objects, wherein the highlighting and distinguishing characteristics include at least one of: underlining and bolding; and
    enabling a user viewing the plurality of data objects to alter the masked data objects during said masking.

2. The method of claim 1, wherein at least one modification is performed on a computer system other than a computer system on which the plurality of data objects is displayed.

3. The method of claim 1, wherein said selecting comprises:
    identifying information that warrants attention of a user, wherein the selected subset of data objects is associated with the identified information.

4. The method of claim 1, wherein said selecting comprises:
    identifying action to recommend to a first user viewing the plurality of data objects, wherein the selected subset of data objects is associated with the identified action.

5. The method of claim 4, wherein said identifying comprises:
    examining a pattern of previous activity of the first user with the plurality of data objects that occurred prior to said displaying of the plurality of data objects; and
    from multiple possible actions the first user may initiate, anticipating from said pattern which of the possible actions is to be initiated.

6. The method of claim 4, wherein said identifying comprises:
   examining a pattern of previous activity with the plurality of data objects by a set of users other than the first user; and
   from multiple possible actions the first user may initiate, selecting an action representative of said pattern.

7. The method of claim 1, wherein said selecting comprises:
   detecting an error within the selected subset of data objects or information associated with the selected subset of data objects.

8. The method of claim 1, wherein:
   each of said plurality of data objects corresponds to input from stimuli external to a program comprising the method of displaying data; and
   said detecting comprises detecting a change to one or more of the external stimuli corresponding to the subset of data objects.

9. A computer-readable medium storing instructions that, when executed by a computer, cause the computer to perform a method of displaying data, the method comprising:
   displaying a plurality of data objects;
   detecting modifications to the plurality of data objects;
   determining a significance of each detected modification;
   selecting a subset of data objects within the plurality of data objects based on the determined significance of each detected modification; and
   masking all but the selected subset of data objects with a semi-transparent mask, wherein masking involves removing highlighting and distinguishing characteristics among the masked data objects, wherein the highlighting and distinguishing characteristics include at least one of: underlining and bolding.

10. A computer system, comprising:
    one or more computer processors; and
    computer-readable media encoded with program code to be executed by the one or more computer processors, including:
        first program code configured to display data on a display component of the computer system;
        second program code configured to detect modifications to the displayed data;
        third program code configured to determine a significance of each detected modification;
        fourth program code configured to select a subset of the displayed data based on the determined significance of each detected modification; and
        fifth program code configured to mask the displayed data with a semi-transparent mask, except for the selected subset, wherein masking involves removing highlighting and distinguishing characteristics among data masked by said semi-transparent mask, wherein the highlighting and distinguishing characteristics include at least one of: underlining and bolding;
    wherein said semi-transparent mask allows a user to view the displayed data but focuses attention of the user on the selected subset of the displayed data; and
    wherein the data masked by said semi-transparent mask is editable by the user.

11. The computer system of claim 10, further comprising sixth program code configured to select the subset of data based on a historical pattern of user activity with the data that occurred prior to the current display of the data.

12. The computer system of claim 10, further comprising sixth program code configured to analyze information associated with the displayed data and identify a recommended action for the user;
    wherein the selected subset of data is associated with the recommended action.

* * * * *